(12) United States Patent
Elimalech et al.

(10) Patent No.: US 11,538,254 B2
(45) Date of Patent: *Dec. 27, 2022

(54) SAFETY SYSTEM FOR A VEHICLE TO DETECT AND WARN OF A POTENTIAL COLLISION

(71) Applicant: MOBILEYE VISION TECHNOLOGIES LTD., Jerusalem (IL)

(72) Inventors: Yaniv Elimalech, Jerusalem (IL); Gideon Stein, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,779

(22) Filed: Jul. 28, 2021

(65) Prior Publication Data

US 2021/0357665 A1    Nov. 18, 2021

Related U.S. Application Data

(63) Continuation of application No. 15/929,905, filed on May 28, 2020, now Pat. No. 11,080,538, which is a
(Continued)

(30) Foreign Application Priority Data

Jun. 29, 2015  (GB) ..................... 1511316

(51) Int. Cl.
*G06V 20/58*     (2022.01)
*G08G 1/16*      (2006.01)
*G06V 10/25*     (2022.01)
*G06V 20/56*     (2022.01)
*B60Q 9/00*      (2006.01)

(52) U.S. Cl.
CPC ............. *G06V 20/58* (2022.01); *B60Q 9/008* (2013.01); *B60R 1/00* (2013.01); *G06V 10/25* (2022.01);
(Continued)

(58) Field of Classification Search
None
See application file for complete search history.

(56) References Cited

U.S. PATENT DOCUMENTS 7,113,867 B1   9/2006  Stein
8,082,101 B2   12/2011 Stein et al.
(Continued)

FOREIGN PATENT DOCUMENTS

DE   10 2013 001324   12/2013
EP         1662459    5/2006
EP         2570963    3/2013

OTHER PUBLICATIONS

Examination Search Report issued from the European Patent Office dated May 16, 2019 in European Patent Application No. 16 736 291.2-1203 (7 pages).
(Continued)

*Primary Examiner* — Eileen M Adams
(74) *Attorney, Agent, or Firm* — Finnegan, Henderson, Farabow, Garrett & Dunner, LLP

(57) ABSTRACT

Systems and methods are provided for processing reports received from vehicles. A processing device perform operations comprising receiving a first report from a first vehicle, the first report generated by the first vehicle for a first hazard detected by the first vehicle; receiving a second report from a second vehicle, the second report generated by the second vehicle for a second hazard detected by the second vehicle; analyzing the first report and the second report to make a determination that the first report and the second report identify a related hazard; aggregating the first report and the second report into a consolidated report based on the determination that the first report and the second report identify a related hazard; and processing the consolidated report to identify a contributing factor to the related hazard.

20 Claims, 8 Drawing Sheets

Related U.S. Application Data continuation of application No. 16/182,461, filed on Nov. 6, 2018, now Pat. No. 10,699,138, which is a continuation of application No. 15/158,294, filed on May 18, 2016, now Pat. No. 10,127,464.

(60) Provisional application No. 62/261,759, filed on Dec. 1, 2015, provisional application No. 62/162,838, filed on May 18, 2015.

(51) Int. Cl.
  *B60R 1/00* (2022.01)
  *H04N 5/232* (2006.01)
  *H04N 7/18* (2006.01)

(52) U.S. Cl.
  CPC .......... *G06V 20/582* (2022.01); *G06V 20/588* (2022.01); *G08G 1/161* (2013.01); *G08G 1/163* (2013.01); *G08G 1/166* (2013.01); *G08G 1/167* (2013.01); *H04N 5/23296* (2013.01); *H04N 7/183* (2013.01); *B60R 2300/30* (2013.01); *B60R 2300/8093* (2013.01)

(56) References Cited

U.S. PATENT DOCUMENTS

| | | | |
|---|---|---|---|
| 8,700,434 B1* | 4/2014 | DeLong | G06Q 10/10 705/4 |
| 10,127,464 B2 | 11/2018 | Elimalech et al. | |
| 10,699,138 B2* | 6/2020 | Elimalech | G08G 1/166 |
| 11,080,538 B2* | 8/2021 | Elimalech | B60R 1/00 |
| 2003/0069695 A1 | 4/2003 | Imanishi et al. | |
| 2004/0189451 A1 | 9/2004 | Zoratti | |
| 2006/0171563 A1 | 8/2006 | Takashima et al. | |
| 2006/0184297 A1 | 8/2006 | Higgins-Luthman | |
| 2008/0122597 A1 | 5/2008 | Englander | |
| 2008/0291000 A1 | 11/2008 | Kim et al. | |
| 2009/0160678 A1 | 6/2009 | Turnbull | |
| 2014/0098997 A1 | 4/2014 | Faber et al. | |
| 2015/0065036 A1* | 3/2015 | Srinivasan | H04W 4/029 455/41.1 |
| 2016/0006922 A1 | 1/2016 | Bourdreau et al. | |
| 2016/0093212 A1 | 3/2016 | Barfield, Jr. et al. | |
| 2016/0371077 A1* | 12/2016 | Moeller | G06F 8/654 |

OTHER PUBLICATIONS

Examination Search Report dated Sep. 15, 2015 in Application No. GB1511316.0.

International Search Report and Written Opinion dated Sep. 28, 2016 n International Application No. PCT/US2016'/033026 (10 pages).

Chinese Second Office Action issued in Counterpart Patent Application No. 201680014477.2 dated Sep. 9, 2020 and its English Translation thereof (13 pages total).

* cited by examiner

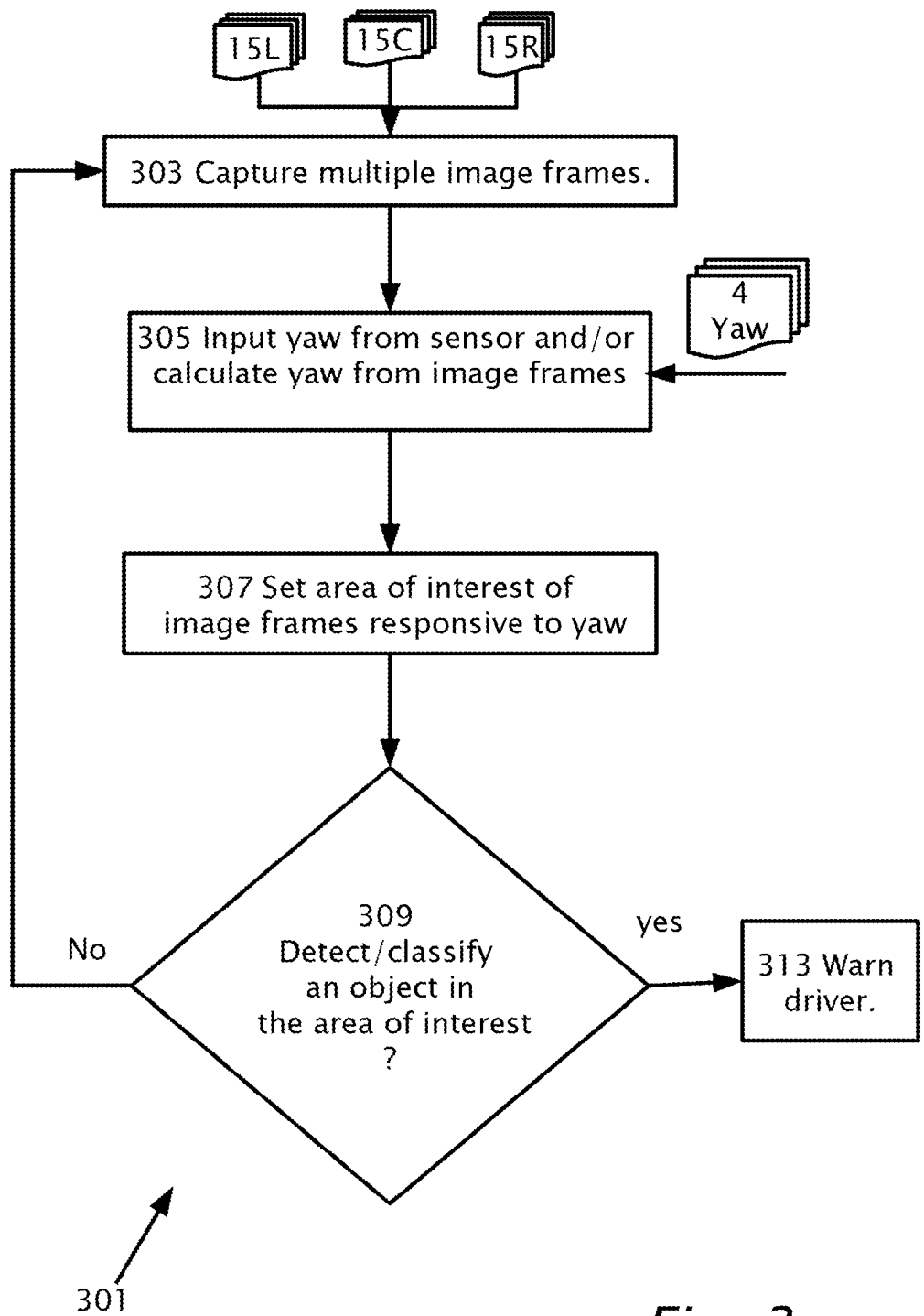

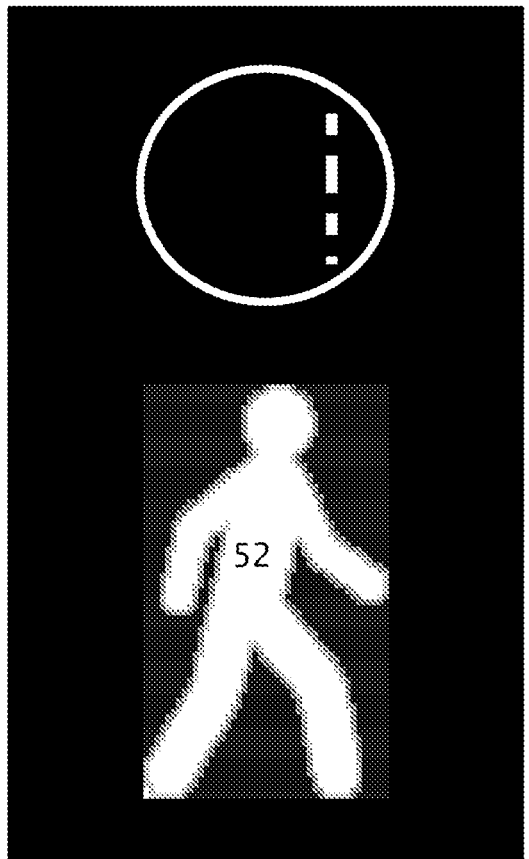
32c  *Fig. 5D*
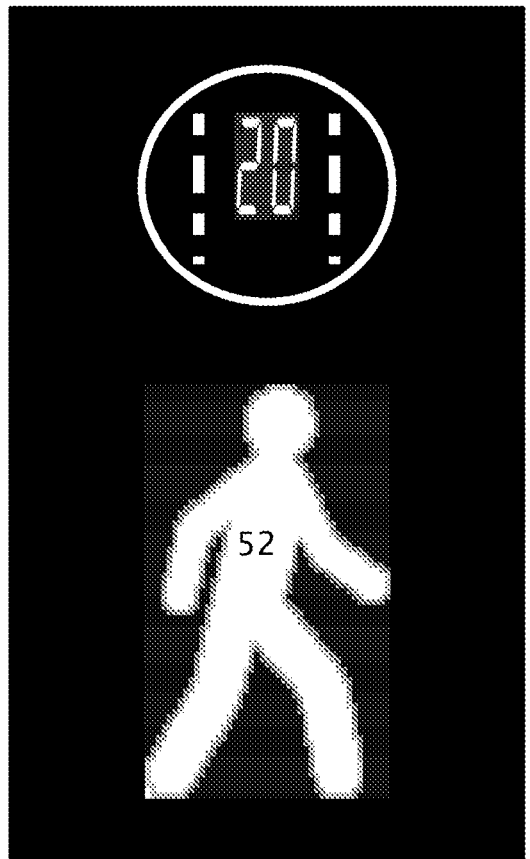
32C  *Fig. 5E*
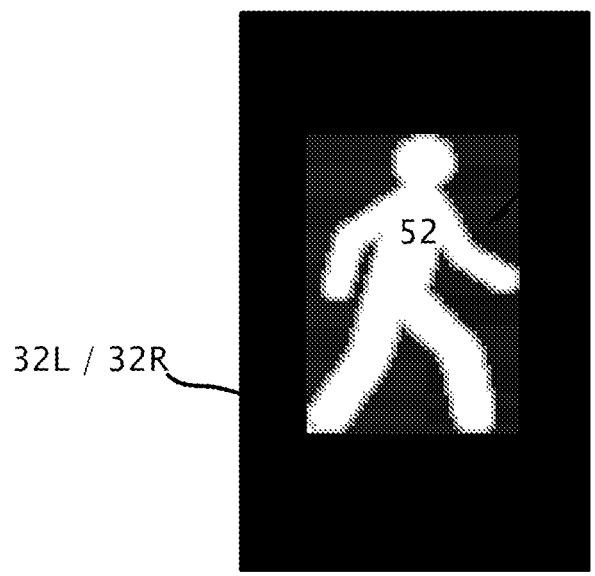
32L / 32R
*Fig. 5F*

SAFETY SYSTEM FOR A VEHICLE TO DETECT AND WARN OF A POTENTIAL COLLISION

CROSS REFERENCES TO RELATED APPLICATIONS

This application is a continuation of U.S. patent application Ser. No. 15/929,905, filed May 28, 2020, which is a continuation of U.S. patent application Ser. No. 16/182,461, filed Nov. 6, 2018, issued as U.S. Pat. No. 10,699,138, which is a continuation of U.S. patent application Ser. No. 15/158,294, filed May 18, 2016, issued as U.S. Pat. No. 10,127,464, which claims the benefit of priority of U.S. Provisional Application No. 62/162,838, filed May 18, 2015, and U.S. Provisional Application No. 62/261,759, filed Dec. 1, 2015. This application also claims the benefit of prior U.K. Application No. GB1511316.0, filed Jun. 29, 2015. All of the foregoing applications are incorporated herein by reference in their entirety.

BACKGROUND

1. Technical Field

The present disclosure relates to a safety system for a vehicle to detect and warn of a potential collision with an object in the path of travel of the vehicle as part of a driver assistance system.

2. Background Information

Driver assistance systems (DAS) typically include lane departure warning (LDW), Automatic High-beam Control (AHC), pedestrian recognition, forward collision warning (FCW) and pedestrian detection. Vehicle detection, pedestrian detection and traffic sign recognition algorithms may share a common general structure: an initial candidate detection followed by more computationally intensive classification of the initial candidate. Obstacle detection may also be performed using various structure-from-motion algorithms.

Lane departure warning (LDW) systems are designed to give a warning in the case of unintentional lane departure. The warning is given when the vehicle crosses or is about to cross the lane marker. Driver intention is determined based on use of turn signals, change in steering wheel angle, vehicle speed and brake activation.

Traffic sign recognition (TSR) modules are designed typically to detect speed limit signs and end-of-speed limit signs on highways, country roads and urban settings. Partially occluded, slightly twisted and rotated traffic signs are preferably detected. Systems implementing traffic sign recognition (TSR) may or should ignore the following signs: signs on truck/buses, exit road numbers, minimum speed signs, and embedded signs. A traffic sign recognition (TSR) module which focuses on speed limit signs may not have a specific detection range requirement because speed limit signs only need to be detected before they leave the image.

The core technology behind forward collision warning (FCW) systems and headway distance monitoring is vehicle detection. A key component of a typical forward collision warning (FCW) algorithm is the estimation of distance from a single camera and the estimation of scale change from the time-to-contact/collision (TTC) as disclosed for example in U.S. Pat. No. 7,113,867.

Structure-from-Motion (SfM) refers to methods for recovering three-dimensional information of a scene that has been projected onto the back focal plane of a camera. The structural information derived from a SfM algorithm may take the form of a set of projection matrices, one projection matrix per image frame, representing the relationship between a specific two-dimensional point in the image plane and its corresponding three-dimensional point. SfM algorithms rely on tracking specific image features from image frame to image frame to determine structural information concerning the scene.

SUMMARY

Various systems and methods are disclosed herein performable by a system mountable in a vehicle to provide object detection in the vicinity of the vehicle. The system includes a camera operatively attached to a processor. The camera is mounted externally at the rear of the vehicle. The field of view of the camera is substantially in the forward direction of travel of the vehicle along the side of the vehicle. Multiple image frames are captured from the camera. Yaw of the vehicle may be input or the yaw may be computed from the image frames. Respective portions of the image frames are selected responsive to the yaw of the vehicle. The image frames are processed to detect thereby an object in the selected portions of the image frames. The yaw is measurable or determinable by processing the image frames, or input from a gyroscopic device, turn signals, steering angle and a sensor attached to the steering column of vehicle. Upon measuring an increase in absolute value of the yaw, a larger area of the image frames is processed to increase an effective horizontal field of view and to detect thereby an obstruction over a wider horizontal angle measured from the side of the vehicle.

For a camera installed on the right side of the vehicle, when the vehicle turns right, a larger area of the image frames is processed to increase an effective horizontal field of view and to detect an obstruction over a wider horizontal angle measured from the right side of the vehicle.

For a camera installed on the left side of the vehicle, when the vehicle turns left, a larger area of the image frames is processed to increase an effective horizontal field of view and to detect an obstruction over a wider horizontal angle measured from the left side of the vehicle. It may be determined that the object is a moving obstacle and verified that the object will be in a projected path of the vehicle to determine a potential collision of the vehicle with the moving obstacle. The driver is warned of the potential collision of the vehicle with the moving obstacle. The warning may be sounded with an audible warning and/or displayed with a visible warning. The warning may issue from the side of the vehicle on which is mounted the camera viewing the moving obstacle. The object may be a bicyclist, a motorcyclist, a vehicle, a pedestrian, a child riding on a toy vehicle, a person with pram and a wheelchair user. Another driver assistance system: lane detection, structural barrier recognition and/or traffic sign recognition may be used to recognize a stationary object, and the warning to the driver may be suppressed if all objects detected in the immediate vicinity of the vehicle are stationary objects. The stationary objects may include a structural barrier, lane marking, a traffic sign, tree, wall and/or a pole.

BRIEF DESCRIPTION OF THE DRAWINGS

The disclosed embodiments are herein described, by way of example only, with reference to the accompanying drawings, wherein:

FIG. 3 shows a flowchart of a method, according to an aspect of the disclosed embodiments.

FIGS. 5B, 5C, 5D and 5E show examples of a center warning display, according to features of the disclosed embodiments.

FIG. 5F shows right and/or left warning displays, according to a feature of the disclosed embodiments.

Figure 1A:
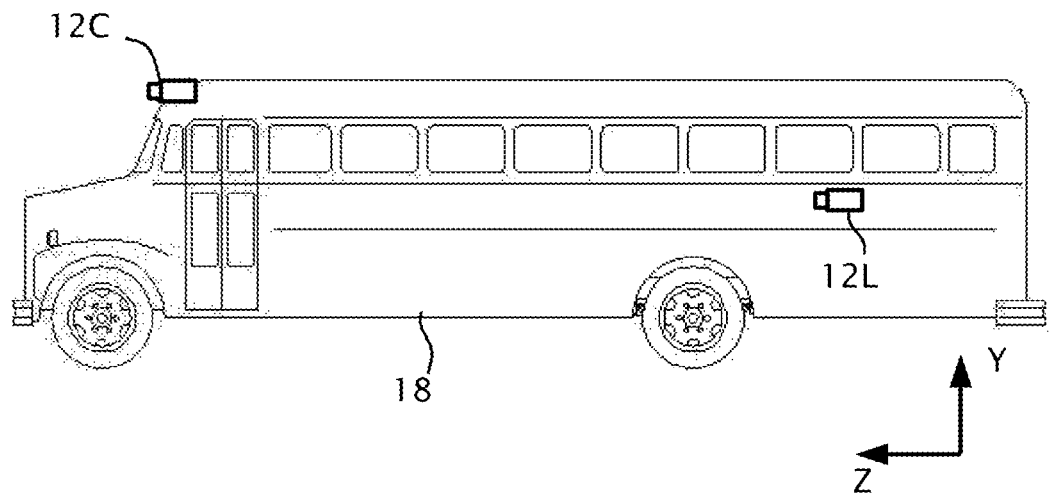
FIGS. 1A and 1B show a side view and a plan view respectively of a vehicle, according to an aspect of the disclosed embodiments.

The foregoing and/or other aspects will become apparent from the following detailed description when considered in conjunction with the accompanying drawing figures.

DETAILED DESCRIPTION

Reference will now be made in detail to exemplary embodiments, examples of which are illustrated in the accompanying drawings, wherein like reference numerals refer to the like elements throughout. The embodiments are described below by referring to the figures.

By way of introduction, it is well known that a driver of a bus or of a heavy vehicle has limited visibility in the immediate vicinity of the vehicle. Particularly, the pillars which separate the front window from the sides of the bus partially blocks the view of the driver. Moreover, the driver has limited field of view at the sides of the vehicle which may be in part compensated for by placement of side mirrors. As such, the driver may be unaware of potential obstacles, e.g., bicyclists, pedestrians, which move into "blind spots" not readily visible by the driver. Disclosed embodiments may provide a warning to the driver when a moving obstacle encroaches to the side of the vehicle especially while turning to avoid a collision between the unseen moving obstacle and the side of the vehicle. According to a feature of the disclosed embodiments, the area of interest in the image frames and the effective horizontal field of view or angle of interest measured from the side of the bus changes when the vehicle is turning. When the vehicle is turning right, the angle of interest on the right side increases and when the bus is traveling straight after the turn the horizontal angle of interest decreases again. The system is configured to process the image frames and detect potential obstacles in the area of interest of the image frames.

Decreasing the area of interest when the vehicle is traveling straight is important to reduce false positive warnings to the driver when the bus is traveling straight and there is less likelihood of collision than during a turn.

A driver of a bus pulling out of a bus stop is normally more attentive to the lane of traffic with which he/she is trying to merge, in the USA for instance to the left of the bus and in Great Britain to the right of the bus, rather than any obstacles which may be adjacent with the sidewalk. If a pedestrian, bicyclist or a child on a toy vehicle falls unexpectedly from the sidewalk into the path of the bus, then an injury or fatality may result. Similarly, the driver of the bus while viewing oncoming traffic through the rear view mirror may be unaware of a pedestrian or bicyclist which moved in front of the bus. Thus, according to another feature of the disclosed embodiments, an audible and/or visible warning to the driver calls his attention to a recognized obstacle near the path of the bus of which he/she would otherwise be unaware.

In some embodiments, the disclosed systems and methods may be implemented to navigate an autonomous vehicle. As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

Figure 1B:
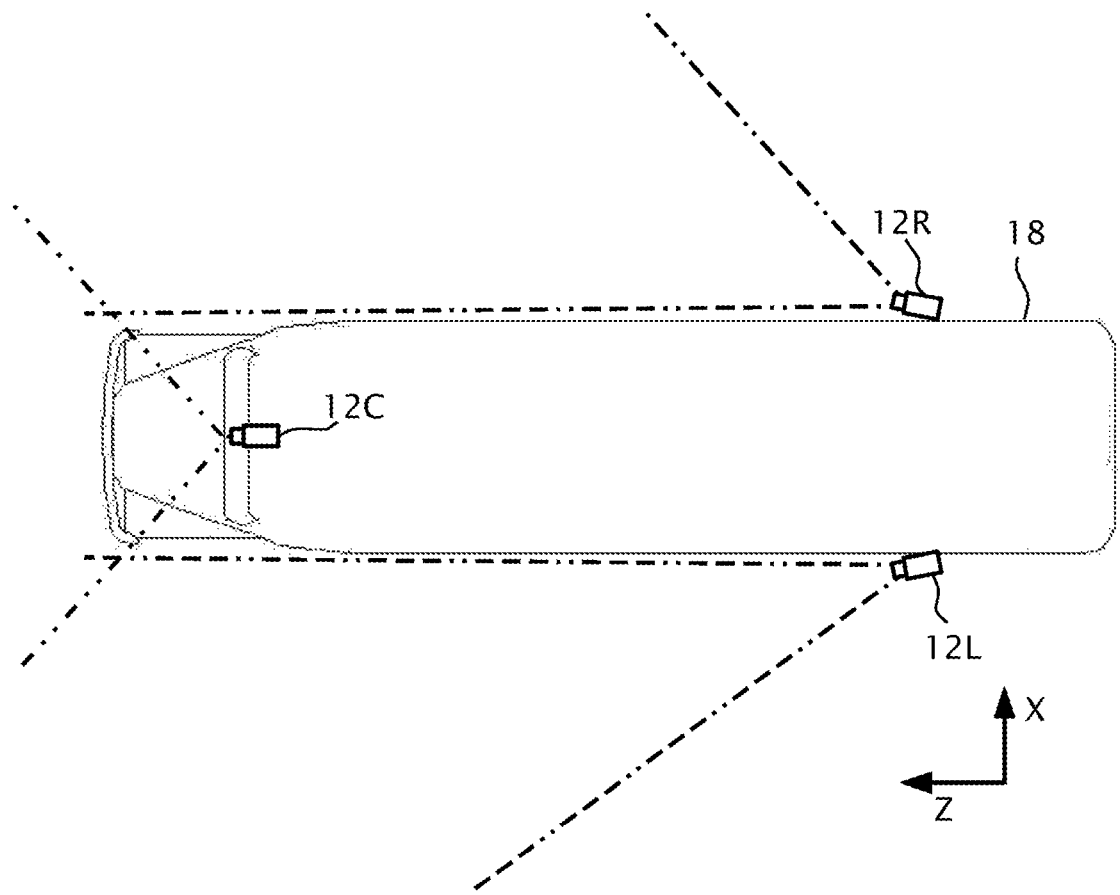

Reference is now made to FIGS. 1A and 1B which show a side view and a plan view respectively of a vehicle 18, according to an aspect of the disclosed embodiments. Vehicle 18 may be a public transport bus, school bus, coach, a heavy goods vehicle (HGV), or a passenger vehicle (e.g., a car, such as a sedan). In some embodiments, vehicle 18 may be longer than a typical vehicle (e.g., such as a limousine, truck, etc.). Mounted near the rear of vehicle 18 on the right and left sides respectively of vehicle 18 are two cameras 12R and 12L. Cameras 12R and 12L are mounted so that the respective fields of view of cameras 12R and 12L include generally the forward direction of travel of vehicle 18 shown by dotted lines. A camera 12C is shown mounted at the front of vehicle 18 with a field of view which is generally centered in the forward direction of travel of vehicle 18 shown by dotted lines. Cartesian axes X, Y, Z are shown. Axis Z is the long horizontal axis along the length of vehicle 18. Axis Y is the vertical axis of vehicle 18. Rotation around axis Y defines yaw of vehicle 18 and/or of cameras 12. Yaw is controlled by the steering mechanism of vehicle 18. Axis X is horizontal along the width of vehicle 18.

Figure 2A:
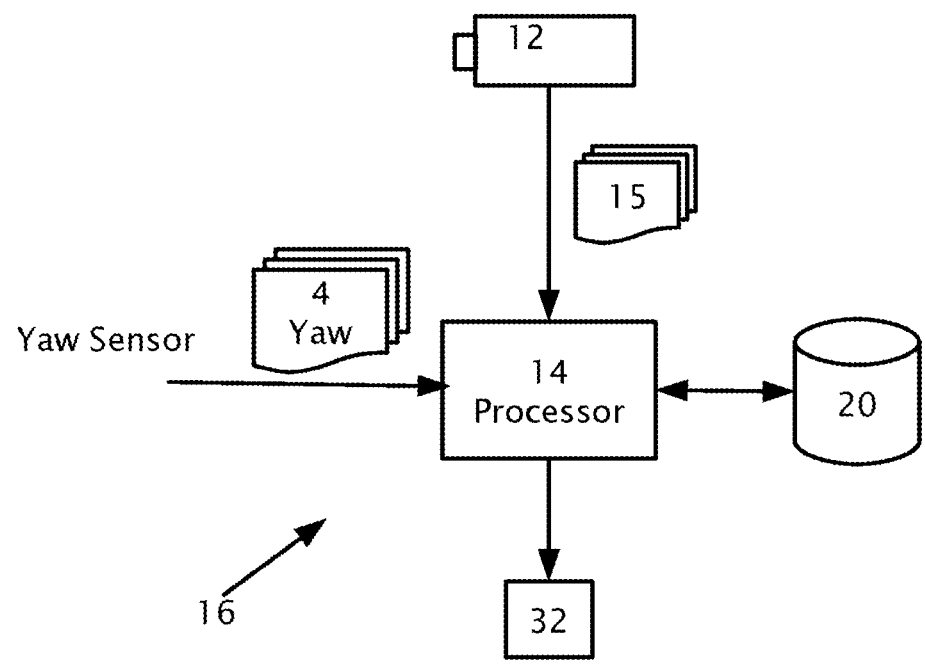
FIG. 2A shows a block diagram of a system, according to an aspect of the disclosed embodiments.

Reference is now also made to FIG. 2A which shows a block diagram of a system 16, which includes camera 12 one of cameras 12C, 12R or 12L showing various features of the disclosed embodiments. Different instances of system 16 may be attached to left camera 12L right camera 12R and center camera 12C which are not separately illustrated for the sake of brevity. Processor 14 receives and processes image frames 15 from camera 12. A storage or memory 20 connects bidirectionally to processor 14. Memory 20 may be used to store the algorithms of camera based driver assistance systems (DAS) known in the art which provide pedestrian and/or other class-based object, e.g. bicycle, motorcycle, detection/recognition and/or general obstacle detection/recognition. An output from processor 14 is shown attached to a display 32. An input to processor 14 from a yaw sensor is shown. System 16 may be installed in multiple places in vehicle 18 as shown in FIGS. 1A and 1B. Alternatively, multiple cameras 12 for instance side cameras 12R and 12L and center camera 12C may be connected to and provide multiple sets of image frames respectively to a single processor 14.

Figure 2B:
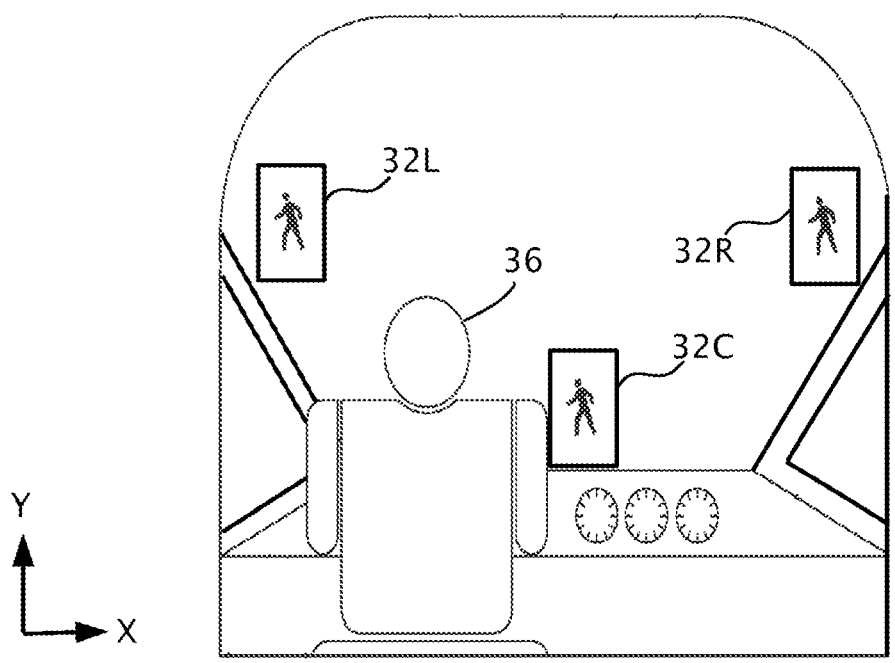
FIG. 2B shows a view from inside a vehicle, according to a feature of the disclosed embodiments.

Reference is now made to FIG. 2B which shows a view 30 from inside vehicle 18, according to a feature of the disclosed embodiments. View 30 shows the back of a driver 36 as driver 36 operates vehicle 18. To the left of driver 36 is a display 32L which is used to provide a visible and/or audible warning to driver 36 of an object detected and/or recognized visible to left camera 12L and recognized if the object is in possible collision with vehicle 18. The detection/recognition of the object is provided by one of processors 14L/14R processing image frames 15L/15R captured by cameras 12L/12R.

In some embodiments, as an alternative to providing a warning to driver 36, system 16 may instead cause the vehicle (e.g., vehicle 18) to take an action. For example, system 16 may analyze the collected data to determine whether or not the vehicle (e.g., vehicle 18) should take a certain action, and then automatically take the determined action without human intervention. For example, in response to recognizing that an object is in a possible collection with the vehicle, system 16 may automatically control the braking, acceleration, and/or steering of the vehicle (e.g., by sending control signals to one or more of a throttling system, a braking system, and a steering system). In yet other embodiments, system 16 may provide a visible and/or audible warning to the driver and cause the vehicle to take an action.

Similarly, to the right of driver 36 is a display 32R which is used to provide a possible warning to driver 36 of a potential collision with an object to the right of driver 36 and/or cause the vehicle to take an action, such as automatically controlling the braking, acceleration, and/or steering of the vehicle (e.g., by sending control signals to one or more of a throttling system, a braking system, and a steering system). In front view of driver 36 is a display 32C which provides visible and/or audible notification of possible detection of an object to the front of driver 36 in image frames 15C captured by camera 12C. Displays 32L, 32C and 32R are positioned to provide a display to driver 36 which follows the view of driver 36 as he/she drives vehicle 18. For example, as driver 36 drives straight ahead, display 33C is positioned in his/her general view, whereas if turning left or right displays 33L and 33R respectively are positioned in his/her general view.

Reference is now also made to FIG. 3 which shows a flowchart of a method 301, according to an aspect of the disclosed embodiments using system 16 which includes multiple cameras 12C, 12R and 12L mounted on vehicle 18 as in FIGS. 1A and 1B. Cameras 12R, 12L and 12C independently provide image frames 15R, 15L and 15C respectively which are captured (step 303) by respectively by processors 14C, 14L and 14R. Yaw information 4 may be input (step 305) into processors 14C, 14L and 14R. Yaw information 4 may be derived from any or combination thereof of a yaw sensor, e.g. gyroscopic device, use of turn signals or change in steering wheel angle via the CAN bus of vehicle 18 or a sensor attached to the steering column of vehicle 18 which provides a measure of steering column angular position/velocity as vehicle 18 turns left or right. Yaw information 4 may be derived alternatively or in addition from processing image motion in image frames 15. For example, in some embodiments, yaw information 4 may be derived by analyzing at least two image frames. The analysis may include identifying an object in the at least two image frames and determining that the object has shifted or moved position. This determination may compare, for example, the position of the object relative to a center point or edge of the at least two image frames.

In step 307, the processor sets an area of interest in image frame 15 responsive to yaw information 4. For instance, if vehicle 18 is turning right, then processor 14R is configured to use a wider portion (nominally in horizontal image coordinates) of images frames 15R for subsequent detection and classification (step 309). If vehicle 18 is turning left, then processor 14L is configured to use a wider portion of images frames 15L for subsequent detection and classification (step 309). If vehicle 18 is traveling straight then processors 14R and 14L are configured to use a narrower portion (in horizontal image coordinates). In decision block 309 algorithms stored in memory 20R/20L and/or included in circuitry of processors 14C/14R/14L are used to detect and/or recognize obstacles such as pedestrians, motorcycles, bicycles and general obstacles, the images of which are at least in part in the area of interest responsive to the yaw information. If such an object is detected and/or recognized then driver 36 is warned (step 313). Otherwise, method 301 continues with capture of multiple image frames (step 303). It is advantageous to set (step 307) the area of interest in image frames 15R/15L responsive to yaw information (step 307) to reduce false positive object detection/classification in the vicinity of vehicle 18 and to avoid frequently warning (step 313) driver 36 when there is no expectation for an object detection/classification in the area of interest (decision box 309).

In some embodiments, in addition to or as an alternative to using yaw information, system 16 may determine to use a portion of one or more image frames (e.g., a wider or narrower portion) based on at least information stored in a local or remote database. For example, the store information may include information collected on prior navigations of a particular area or location. This information may include areas with likely obstacles, such as pedestrians, and the information may specific the portion of the image frames to use in such areas. In some embodiments, the portion of an image frame to use for subsequent detection and classification may be chosen based on stored map data and/or based on a location of the vehicle determined via GPS data. For example, based on a location of the vehicle, system 16 may determine to use a certain portion of one or more image frames for subsequent detection and classification.

Figure 4A:
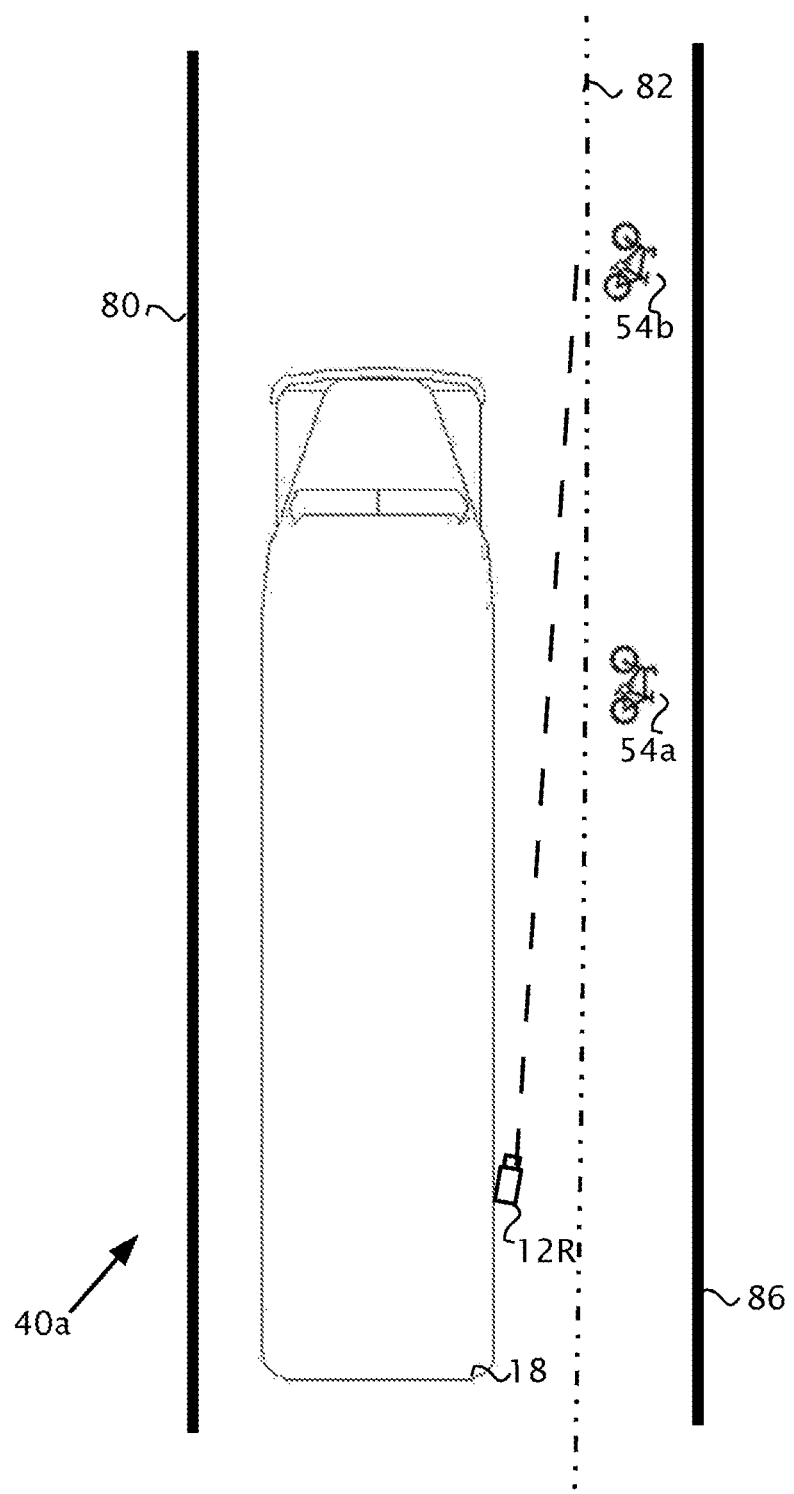
FIGS. 4A and 4B, show diagrams of road scene scenarios, according to an aspect of the disclosed embodiments.
Figure 4B:
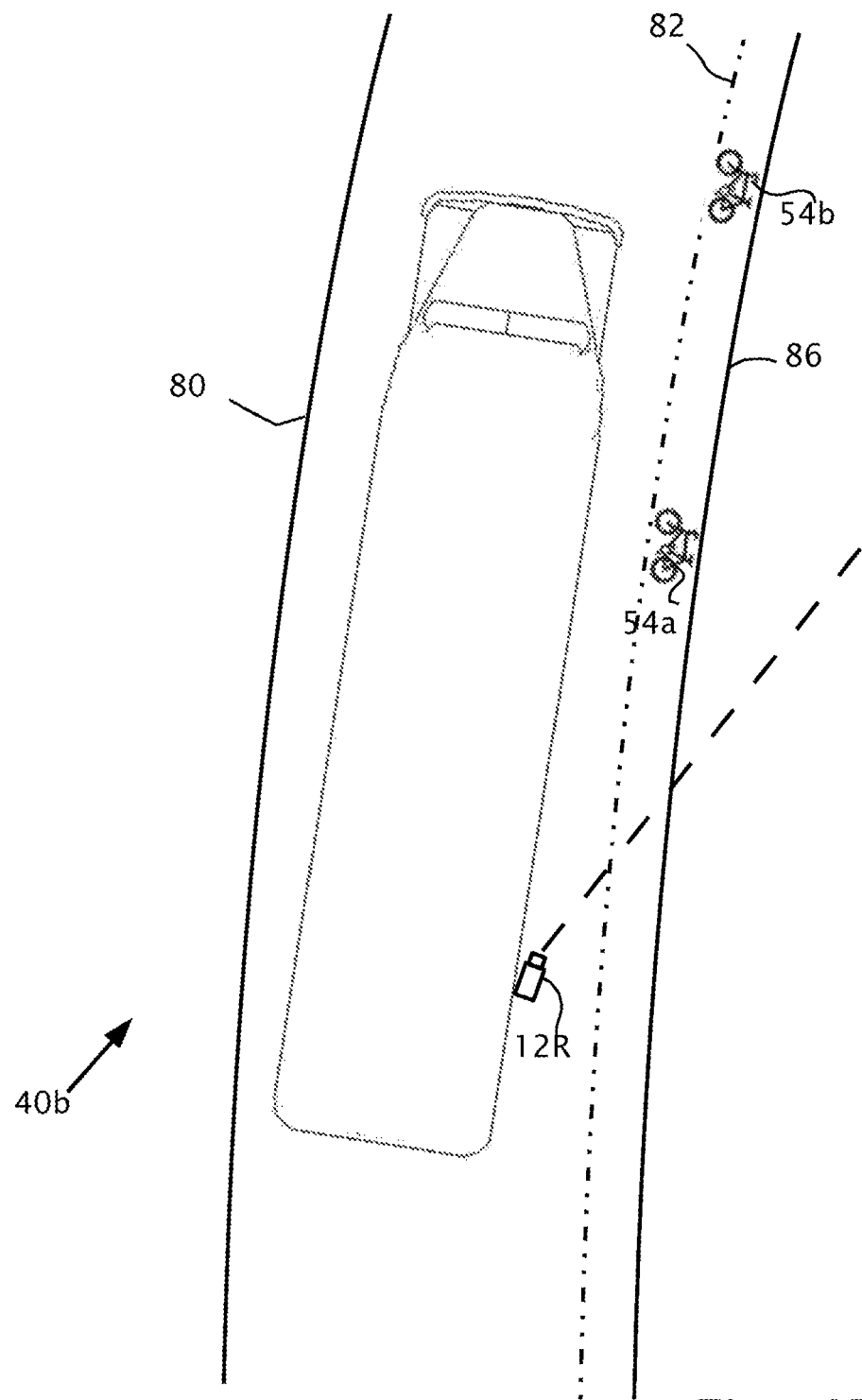

Reference is now made to FIGS. 4A and 4B, which shows a diagram of a road scene scenario 40a and 40b respectively, according to aspects of the disclosed embodiments. In FIG. 4A, vehicle 18 is shown traveling on a straight road equipped with camera 12R by way of example. Objects 54a and 54b are shown which may be bicyclists traveling in a bicycle lane. The dotted line emanating from camera 12R shows the extent of the horizontal effective field of view. Outside the horizontal effective field of view, although images of objects 54a and 54b may be imaged by camera 12R, algorithm 309 does not detect/classify objects 54a and 54b. Object 54b may be partially occluded by the right front pillar of vehicle 18. Nevertheless, as vehicle 18 is traveling straight, there is little chance of a collision with objects 54a and 54b which are stationary or also traveling straight for instance in the bicycle lane.

The presence of a stationary object such as structural barrier 86 may be determined by use of a Structure-from-Motion (SfM) algorithm using image frames from right camera 12R. SfM may recover three-dimensional information from stationary structural barrier 86. The presence of a stationary barrier 86 in the absence of other obstacles such as moving or stationary obstacles 54a/54b, suppresses warning driver 36 to avoid an unnecessary false positive warning.

In the case where structural barrier 86 may be a sidewalk, a positive warning may be issued by use of the SfM algorithm. Vehicle 18 turning at an intersection adjacent to the sidewalk, e.g., a right turn from the right most lane, may encroach onto the sidewalk even though the right front wheels did not mount the sidewalk. A pedestrian standing on the corner might be hit. If the bus or truck is turning too sharply then a warning may be issued if a pedestrian is detected on the sidewalk. Detection and classification by the SfM algorithm may indicate the curvature of the sidewalk at the intersection. If vehicle 18 makes a right turn at the intersection, the area of interest in image frames 15R responsive to yaw information (step 307) may be increased to warn driver 36 that the present right turn has a potential for the side of vehicle 18 to encroach of the sidewalk Reference is now also made to FIG. 4B showing a road scenario 40*b*. Vehicle 18 is shown turning on a right curve, and detection and classification algorithm 309 is configured to use a wider horizontal angle shown by a dotted line emanating from camera 12R. The wider horizontal angle corresponds to a wider image portion in horizontal image coordinates of images frames 15. Again obstacles 54*a* and 54*b* are shown. Obstacle 54*b* may be partially occluded by the right front pillar of vehicle 18. If vehicle 18 is turning right, it may not be clear whether moving obstacle, e.g bicyclist 54*b* is intending to travel straight at a nearby intersection or if bicyclist 54*b* is intending to turn right in parallel with vehicle 18. Even if bicyclist 54*b* is intended to turn right, the road condition may be such that bicyclist 54*b* may unintentionally skid into vehicle 18 during the right turn. In this case, detection/recognition of a bicyclist in the effective field of view of right camera 12R may cause a warning (step 313 FIG. 3).

In decision block 309, algorithms stored in memory 20C/20R/20L and/or included in circuitry of processors 14C/14R/14L may be used to detect and/or recognize obstacles responsive to the yaw information. If an object is detected and/or recognized then driver 36 is warned (step 313).

Figure 5A:
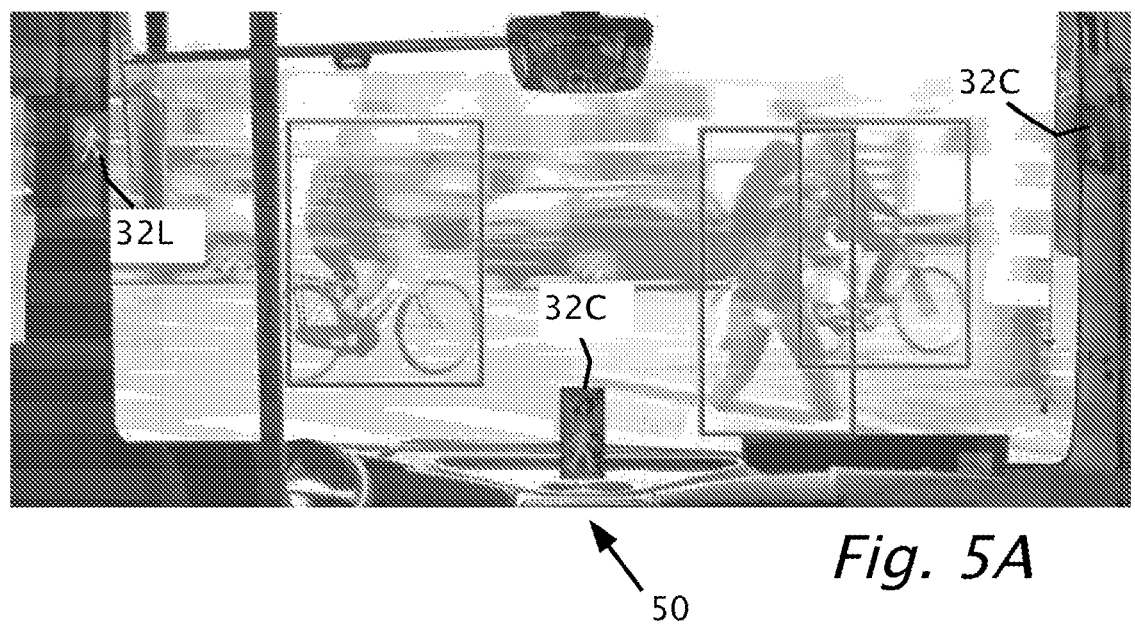
FIG. 5A shows a driver's forward view from inside a vehicle, according to features of the disclosed embodiments.

Reference is now made to FIG. 5A which shows a driver's forward view 50 from inside vehicle 18, according to features of the disclosed embodiments Vehicle 18 may be equipped with multiple systems 16 (FIG. 2A) each with image frames 15 captured by processor 14 from camera 12. Processor 14 processes image frames 15 and recognizes or detects an obstacle which may collide with vehicle 18.

Alert display 32L is shown to the left of the steering wheel of vehicle 18. Alert display 32L connects to an output of processor 14L which captures image frames 15L from camera 12L. An alert output of processor 14L may be displayed by display 32L to provide a warning to driver 36 of vehicle 18. The warning may be of an obstacle recognized by processor 14L which is in field of view of left camera 12L where the obstacle is in possible collision with vehicle 18. On the right side of vehicle 18, may be another display 32R connected to an output of processor 14R. An alert output of processor 14R may be displayed by display 32R to provide a visible warning to driver 36 of vehicle 18. The warning may result from an obstacle recognized by processor 14R in field of view of right camera 12R where the obstacle is in possible collision with vehicle 18.

Alert display 32C is shown positioned in the center at the bottom of the windshield above the dashboard of vehicle 18. Processor 14C processes image frames 15C captured from a center camera 12C and recognizes an obstacle with which vehicle 18 may be on a collision course. An output of processor 14C connects to display 32C to provide a warning to driver 36 of vehicle 18. The warning output of processor 14C may be displayed visually by display 32C. The warning may be of the obstacle recognized by processor 14C which is visible to center camera 12C.

Three recognized objects are shown marked with rectangular boxes, two of the recognized objects are cyclists and the other obstacle is a pedestrian. Since the three recognized objects are in front of vehicle 18, an appropriate warning may be sounded and/or displayed on one or more of displays 32R, 32L and/or 32C depending on which of cameras 12L, 12R, 12C views the recognized obstacle. Similarly, sounding of an audible warning may depend on which camera views the recognized obstacle. If the recognized obstacle is on the right side of vehicle 18, a speaker or buzzer positioned on the right side of the driver may sound the warning optionally collocated in a housing with right display 32R. Similarly, if the recognized obstacle is on the left side of vehicle 18, a speaker or buzzer positioned on the left side of the driver may sound the warning optionally collocated in a housing with left display 32L. If the recognized obstacle is recognized forward and center of vehicle 18, a speaker or buzzer positioned near the driver may sound the warning optionally collocated in a housing with center display 32C.

Reference is now made to FIGS. 5B, 5C, 5D and 5E which show examples of display 32C in greater detail, according to features of the disclosed embodiments. FIGS. 5B, 5C, 5D and 5E show four possible warnings which may be visibly displayed from display 32C.

Figure 5B:
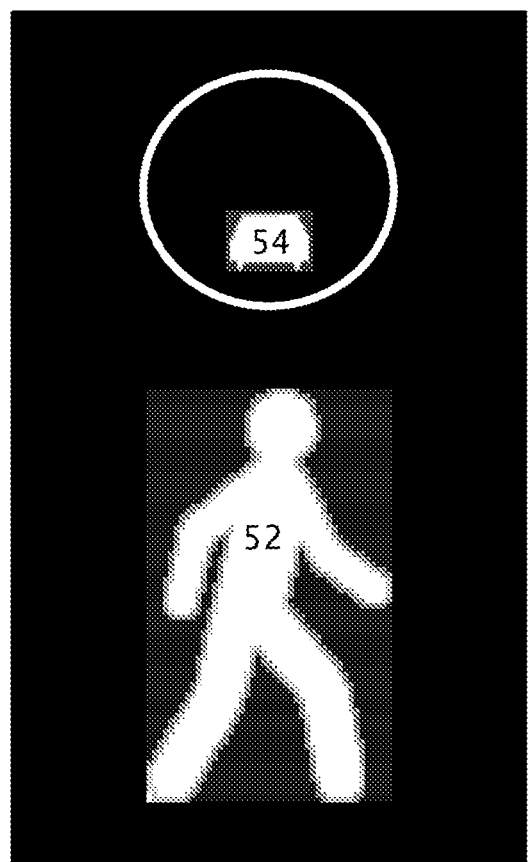

With reference to FIG. 5B, display 32C provides a warning to driver 36 of vehicle 18 of an imminent rear-end collision with a car, truck or motorcycle moving at any speed. The warning is shown by a vehicle icon 54 in the circular section flashing red for example and/or accompanied with an audible warning. If an imminent collision is with a pedestrian, the pedestrian icon 52 may similarly flash red and/or be accompanied with an audible warning. The warning of the imminent collision with a pedestrian may be only active under a speed limit appropriate for the area which vehicle 18 is traveling i.e., for example, in a built up area where there are pedestrians.

Figure 5C:
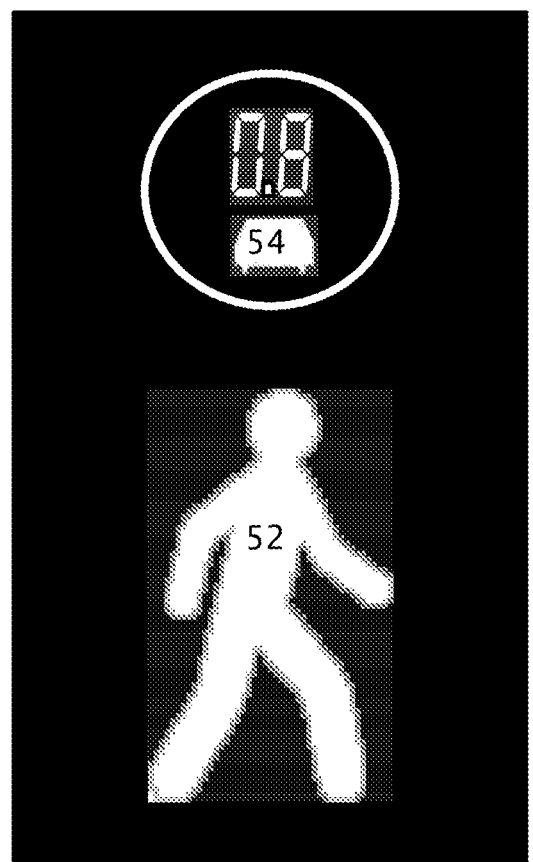

With reference to FIG. 5C, display 32C provides a headway warning accompanied by a following time displayed as 0.8 seconds. The term "headway" as used herein is defined as a time interval to reach the current position of an obstacle ahead of vehicle 18, and may be calculated by dividing the distance to the obstacle by the travel speed of vehicle 18. If headway in seconds falls below a predefined value, a visible and/or audible warning may displayed to driver 36.

If the obstacle is a lead vehicle or an oncoming vehicle a vehicle icon 54 may be used to alert the driver and/or an audible warning together with the display of headway.

With reference to FIG. 5D, display 32C provides a lane departure warning (LDW) shown by dotted line in the circular section of display 32C. In the case of FIG. 5D, the dotted line is located on the right side of the circle to indicate to driver 36 that vehicle 18 has departed lane on the right side without the use of turn signals. Similarly, a departure on the left hand side of a lane may be warned with a dotted line located on the left side of the circular section of display 32C. Lane departure warnings may be displayed with dotted line flashing and/or accompanied with an audible warning. The lane departure warning (LDW) may be activated when vehicle 18 is traveling faster than a threshold speed. LDW may be activated differently if the road is an urban road, highway or country road. For example in an urban road with bus stops and pedestrians, vehicle 18 often crosses lane markings and lane departure warning may be activated differently or suppressed.

Reference is now is made to FIG. 5E, display 32C provides a visible and/or audible warning if driver 36 exceeds the posted speed limit. An example posted speed limit in this case is shown on display 32C as 20 miles per hour or 20 kilometers per hour.

Reference is now is made to FIG. 5F which shows displays 30L/30R in greater detail, according to a feature of the disclosed embodiments. The warnings provided on displays 30L/30R are as a result of a recognition of an obstacle by processors 14L/14R. Processors 14L/14R process image frames 15L/15R captured by cameras 12L/12R and a warning may be issued from the processor 14L/14R and displayed on respective displays 32L/32R according to the description that follows.

Displays 30L/30R include pedestrian icon 52. A flashing or solid yellow display of pedestrian icon 52 may warn driver 36 of vehicle 18 turning left or right of a potential collision with an obstacle. The flashing or solid yellow display of pedestrian icon 52 indicates to driver 36 that a pedestrian or cyclist is near but is not within a collision trajectory of vehicle 18. However, a flashing or solid red display of pedestrian icon 52 and/or audible sound, on respective displays 30L/30R may warn driver 36 of vehicle 18 that a pedestrian or cyclist is within a collision trajectory of vehicle 18 as vehicle 18 is turning left or right.

Figure 6:
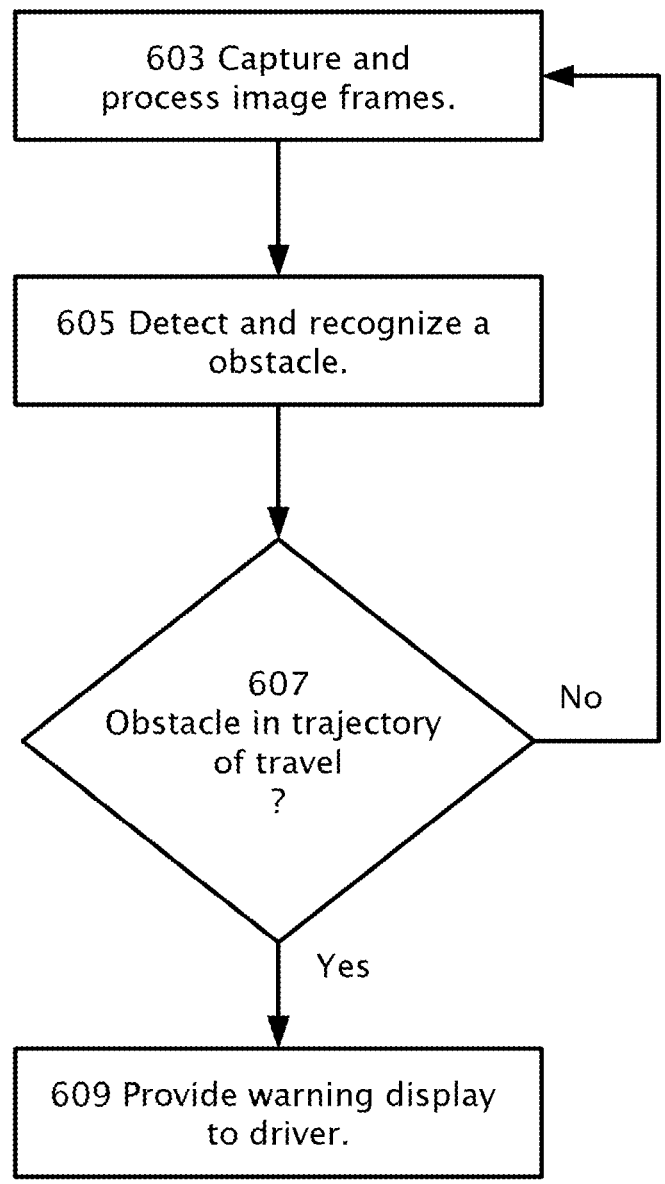
FIG. 6 shows a flowchart for a method, according to aspects of the disclosed embodiments.

Reference is now made to FIG. 6, a flowchart for a method 601, according to aspects of the disclosed embodiments. In the discussion that follows, reference is made to camera 12L, processor 14L and display 32L. However, the method steps as follows are similar for other systems 16 of: cameras 12R, 12C; processors 14R, 14C; and displays 32R, 32C. Method 601 may be performed in parallel by each of systems 16. In step 603, several image frames 15 captured from camera 12L by processor 14L are processed so that in step 605 a candidate image is detected and/or recognized as an obstacle in the field of view of camera 12L. In step 607 a decision is made if an obstacle detected and/or recognized in step 605 is in the trajectory of travel of vehicle 18 such that vehicle 18 is likely to collide with the obstacle. If the trajectory of travel of vehicle 18 is likely to collide with the obstacle then a visible and/or audible warning is provided (step 609) to driver 36 of vehicle 18 via display 32L.

Alternatively, as described above, in some embodiments, as an alternative to providing a warning to driver 36, system 16 may instead cause the vehicle (e.g., vehicle 18) to take an action. For example, system 16 may analyze the collected data to determine whether or not the vehicle (e.g., vehicle 18) should take a certain action, and then automatically take the determined action without human intervention. For example, in response to recognizing that an object is in a possible collision with the vehicle, system 16 may automatically control the braking, acceleration, and/or steering of the vehicle (e.g., by sending control signals to one or more of a throttling system, a braking system, and a steering system). In yet other embodiments, system 16 may provide a visible and/or audible warning to the driver and cause the vehicle to take an action.

Many vehicles have blind spots, which blocks the ability of the operator of the vehicle to notice hazards at certain areas around the vehicle. In dense urban environments, where Vulnerable Road Users (VRUs), including, for example, pedestrians and cyclists, often share the road with vehicles, blind spots and the inability of an operator to detect VRUs in their blind spots is a serious problem and can lead to grave results. Blind spots may be a particularly severe problem for operators of large vehicles, such as trucks (or Lorries) and public transport vehicles, especially in urban environments.

Accordingly, in still other embodiments, the disclosed systems and methods select at least a portion of one or more image frames responsive to identifying a potential risk of a blind spot. The disclosed systems and methods may then process the selected portions of the one or more image frames to detect, for example, an object in the selected portions of the image frames. Further in some embodiments, as discussed below, portions of image frames may be selected based on areas in which potential blind spots and/or associated hazards are known based on, for example, data collected by the system in previous drives in a particular location (e.g., based on a report, as discussed below in more detail). Further still, in some embodiments, selection of at least a portion of one or more image frames may be based on a yaw rate of the vehicle and collected data (e.g., a report, etc.).

For example, in some embodiments, the disclosed systems and methods may be configured to detect VRUs. Optionally, the systems and methods may be configured to detect VRUs while ignoring inanimate objects. In some embodiments, the system can include a master camera and one or more slave cameras. The master camera can be configured to serve an Advanced Driver Assistance System (which can be implemented on the processor) to the operator in addition to detecting VRUs. The slave cameras may be configured to receive input from the master camera and can monitor one or more blind spots around the vehicle. The processor may process the images from the one or more cameras and detects a potential hazard in a blind spot. Optionally, the processor may be configured to issue an alert when a hazard is detected in a blind sport area. Optionally, the processor may be configured to initiate an operation in the vehicle or in one of the vehicle's systems in response to detecting a hazard in a blind spot of the vehicle.

For example, the system (e.g., system 16) may include a camera control unit that is configured to adjust an effective coverage of at least one camera that is mounted on or in the vehicle and which is used to monitor a certain area around the vehicle. Still further by way of example, the camera control unit may be configured to adjust an effective field of view of the least one camera. In yet another example, the camera control unit can be configured to rotate the at least one camera so as to adjust its field of view in a desired direction, as necessary. Optionally, the camera control unit can be implemented in a master camera, and the master camera may be configured to control and adjust at least one slave camera. According to a further example, the master camera may be configured to control the detection angle of the slave cameras so that they are configured to detect VRUs in specific areas (e.g., effective FOVs) around the vehicle. In some embodiments, the system may include one, two, three, four or more cameras. For convenience, and by way of non-limiting example, in the following description, the system's cameras are sometime referred to as "a camera array." The processor may be configured to control a first camera in the camera array according to a respective adjustment which the processor applied or is about to apply to a second camera in the camera array. In another example, two or more of the cameras in the camera array may be adjusted cooperatively and in concert. Optionally, the adjustment of the cameras may be performed in connection with a dynamically changing location or with a projected location of one or more blind spots in relation to the vehicle.

In some embodiments, the disclosed systems and methods may display a map of hazards detected by smart cameras and/or of alerts issued by smart cameras onboard vehicles. The term "smart camera" refers to a camera, which captures images, or a video sequence, or an environment, and one or more processors (and possibly other computer hardware) which process the images to provide information about objects appearing in the images. Various smart cameras are known and used in driver assistance systems and in autonomous vehicle systems. According to examples of the presently disclosed subject matter, the method can include: receiving a plurality of reports of hazards detected by smart cameras and/or of alerts issued by smart cameras onboard vehicles and storing them, each one of the plurality of reports includes at least a location information, where the location information is a location in a global coordinate of a respective hazard detected by a smart camera and/or of a respective alert issued by one or more smart camera onboard a vehicle; receiving a display parameter and providing indication on the map of hazards detected by smart cameras and/or of alerts issued by smart cameras on board vehicles according to the display parameter. In a further example, the method can include, based on the display parameter, aggregating two or more reports of hazards detected by smart cameras and/or of alerts issued by smart cameras onboard vehicles, according to the display parameter.

Still further by way of example, the display parameter may be a region of interest which indicates which portion of the map is to be displayed on a display screen to the user. Further by way of example, the indications on the map of hazards detected by smart cameras and/or of alerts issued by smart cameras onboard vehicles are indications of hazards detected and/or of alarms issued within the region of interest. Further by way of example, the region of interest can be adjusted dynamically, and the display of the hazards detected and/or of alarms issued may also change dynamically and respectively. For example, the display parameter may be a scale of the map. In yet further examples, hazards detected by smart cameras and/or of alerts issued by smart cameras onboard vehicles may be aggregated according to a scale of the map. Thus for example, when the scale of the map is relatively large, detected hazards and/or issued alerts from a relatively large area may be combined and a respective indication of the aggregate detected hazards and/or issued alerts may be displayed on the map in a location which is, for example, a center location of all the detected hazards and/or issued alerts, whereas when the scale of the map is relatively small, detected hazards and/or issued alerts from a relatively small area are combined and a respective indication of the aggregate detected hazards and/or issued alerts is displayed on the map. It would be appreciated that this feature can enable a dynamic display of at least a location aspect of detected hazards and/or issued alerts. Thus for example, a user can start with a map of an entire metropolitan area, viewing a general layout of detected hazards and/or issued alerts, and by zooming in, the user can gradually (although it can also be in a non-gradual manner) hone in on specific areas where a large number of alerts were triggered in a single location.

For example, when a plurality of detected hazards and/or issued alerts are reported for a single location or for a certain area, an indication may be displayed at the respective location of the map, and the indication can be associated with the number or density of the reported detected hazards and/or issued alerts. In another example, the indication can also be associated with a severity of the detected hazards and/or issued alerts. In still further examples, thresholds can be set, for example, by a user, or predefined threshold can be provided, to set forth conditions when different types or different information is displayed on the map in association with respective detected hazards and/or issued alerts. In still further examples, the indications on the map may relate to reported detected hazards and/or issued alerts can also be associated with a respective type of each detected hazard and/or issued alert. In a further example, detected hazards and/or issued alerts may be aggregated together. In still further examples, a counter which displays a number of events or reports (for example a total number of detected hazards and/or issued alerts) may be updated according to a number of detected hazards and/or issued alerts of the same type that are associated with a certain location or area in the map. A size of an area associated with a counter, and optionally its location, may be associated with a scale of the map or with an area shown in the map. In a digital map, the scale and area of reference may be dynamically adjusted, and as the scale changes, so could the display of the detected hazards and/or issued alerts.

In some embodiments, the disclosed systems and methods may generate a signature of hazards detected by smart cameras and/or of alerts issued by smart cameras onboard vehicles. As mentioned above, one or more cameras and at least one processor may be mounted on a vehicle. The processor may process the images from the camera and detect hazards around the vehicle, which may trigger alerts and/or operations in the vehicle or in one of the vehicle's systems. For example, the processor may be configured to issue a report with respect to a detected hazard in a vicinity of the vehicle. The processor may cause the report to be communicated to a backend server, or the processor may locally store the reports (e.g., in a memory onboard the vehicle) and the backend server may be configured to 'pull' such reports. Optionally, a report may include a location of a hazard and a time when the hazard was detected or when an incident that is associated with the hazard occurred (e.g., when the incident was captured by the onboard camera). Optionally, the report can include information about the type of hazard that was detected. In addition or as an alternative to the type of hazard indication, the report can include one or more images that are associated with the detected hazard, including images of an incident or a potential incident which triggered the alert or the operation images of the road and/or of the surrounding environment and infrastructure, and possibly information about the camera that was used to capture the images.

In some embodiments, the server may be configured to process incoming reports from smart cameras onboard vehicles. Optionally, the server can be configured to identify related reports, for example, reports that are associated with a common or with a related safety hazard, and the server can generate a signature in respect of a certain safety hazard. Each signature can be associated with one or more reports of a safety hazard. Further, for example, the disclosed systems and methods may identify similar safety hazards that are associated with hazards detected by a smart camera mounted on a vehicle. In one example, a matching algorithm may be used to determine if two different data sets, when compared, yield a result that is within a predefined threshold or range. Thus for example, an indication of similarity of a safety hazard between a first set of reports and a second set of reports can be concluded when in the first set of reports, the area or the point where an object that triggered a hazard detection and/or alert was located relative to the vehicle at a certain location or at a certain set of locations that is/are identical or close enough (according to some proximity threshold) to the respective location or area in a second set of reports.

In another example, image processing, geometrical representation, schematics and the like may be used to determine similarity, such that, for example, when two environments have an identical or close enough (according to some similarity threshold) layout. The layout may be a general layout of the street, or even just a position of single object. For example, it can be determined in one location where a relatively large number of hazards were detected or alerts where issued, that a certain sign on the sidewalk blocked the line of sight of a bus whose route passed by the sign, as well as the line of sight of pedestrians which crossed the street near the sign. This ill-positioned signed caused a large number of hazard detections or alerts. The reports indicated the points relative to the vehicle where the hazard was detected or the alerts were issued, and also a position of the inanimate object relative to the bus, or the sign in this particular example. Sometime later, a similar situation at a different location (for example, a different street, a different city, or even a different country) caused a similar hazard detections or alerts pattern, and the reports may have indicated an inanimate object that is located at a similar location relative to the vehicle.

In some embodiments, the system may include a memory that is capable of storing a plurality of safety hazard entries, where each safety hazard entry includes a signature. Each signature may include structured data which characterizes the underlying safety hazard. The system may further include a processor that is configured to receive a first safety hazard entry, extract from the first safety hazard entry a first signature, and generate a search query based on the first signature. According to one example, the search query may include at least one acceptable range that is based on at least a first data item in the first signature, and the processor may be configured to retrieve from the memory at least a second signature that includes at least a second data item that is within the predefined range. In another example, the processor may be configured to retrieve any signature that is within the acceptable range.

In some embodiments, the disclosed systems and methods may select and/or suggest a reaction to a first safety hazard based on a similarity between a signature with which the first safety hazard is associated and a signature with which a second safety hazard is associated, where the suggested reaction to the first safety hazard is a reaction that was applied to the second safety hazard. The reaction may be a simulated or virtual reaction, or an actual physical measure that was taken in an attempt to mitigate or eliminate the hazard. The system can include, by way of example, memory and a processor. The memory may hold a safety hazard entry. Optionally, the safety hazard entry can include a signature of a detected hazard and/or issued alert reported by smart cameras on board a vehicle. For example, a signature may be associated with a plurality of hazard detections and/or with a plurality of issued alerts, which plurality of detected hazards and/or issued alerts were determined to be associated with one another. The plurality of hazard detections and/or with a plurality of issued alerts that are associated with the signature may have originated from a plurality of vehicles (each having a smart camera onboard). For example, the detected hazards and/or issued alerts which are associated with a certain signature can be hazards or alerts which have been determined to be associated with a specific cause or with a plurality of related causes. Optionally, some or all of the data may be structured, such that it can be searched, evaluated, co-processed with data from other safety hazard entries (e.g., combined, compared, etc.).

Further by way of example, the safety hazard entry may be associated with a specific reaction or with related reactions. Optionally, a safety hazard entry may be associated with a single reaction, or in some cases and according to some examples of the presently disclosed subject matter, a safety hazard entry can be associated with more than one reaction (e.g. with two, three or more reactions). Optionally, the reaction data may be structured, such that it can be searched, evaluated, co-processed with data from other safety hazard entries (e.g., combined, compared, etc.). The reaction data may be related to a change that was made in the road and/or in its surroundings. Optionally, in association with the reaction data there can be stored an indication of an efficacy of the underlying reaction, and possibly of other effects and tradeoffs, such as: if any parking areas were cancelled to provide the reaction, if congestion increased as a result, if a new hazard was created or an existing one was exacerbated, and possibly also to what extent, etc.

Optionally, the reports may be processed to determine the root cause or causes and/or the contributing factors or circumstances which contribute to the safety hazard. In another example, the root cause or causes and/or the contributing factors or circumstances which contribute to the safety may be provided manually by a user. For example, the processor can be configured to provide the structured signature based on the processing of the reports from smart cameras onboard vehicles. According to examples of the presently disclosed subject matter, a reaction report may also be stored in the memory. The reaction report may be associated with one of more safety hazards. In one example, the reaction report may be associated with a certain safety hazard signature, and thus any safety hazard entry whose signature matches or is similar enough to the signature with which the reaction report is associated, may become associated with the reaction report.

By way of example, by providing a signature of a yet to be resolved safety hazard, it may be possible to provision or select a solution to the yet to be resolved safety hazard based on a similarity between its signature and the signature or one or more previously resolved safety hazards. The use of the term previously resolved should not be construed as binding the examples in the present disclosure the solutions which are necessarily successful in resolving the underlying problem, and that in many cases the solutions can be partially successful, and in other cases there could be a tradeoff for a given solution, and in various circumstances the tradeoff may be more or less appealing, and even unacceptable, and indeed in certain examples of the presently disclosed subject matter, more than one solution can be returned for a given signature, and the processor can be configured to select from the plurality of solutions returned for a given signature the ones or one which provides the based tradeoff or which does not contradict one or more constraints with which the respective signature of the subject unresolved safety hazard is associated.

Various methods may be performed by systems mountable in a vehicle to provide object detection in the vicinity of the vehicle. The systems include multiple cameras operatively attached to one or more processors. A right camera is mounted externally on the right side at or toward the rear of the vehicle and/or a left camera is mounted externally on the left side at or toward the rear of the vehicle. The fields of view of the cameras are substantially in the forward direction of travel of the vehicle. A right warning device is mountable on the vehicle to the right of the driver and a left warning device is mountable on the vehicle to the left of the driver. The right warning device and the left warning device are connectable to the one or more processors.

Multiple image frames may be captured from the cameras. The image frames may be processed to detect a moving object in a portion of the image frames. It may be determined that a potential collision of the vehicle with the moving object has a likelihood greater than a threshold and a warning may be issued either by sounding an audible warning or displaying a visual warning to a driver of the vehicle responsive to the likelihood of the potential collision with the moving object. When the detected object is viewed by the right camera, the warning may issue from a right warning device mounted on the vehicle to the right of the driver and when the detected object is viewed by the left camera, the warning may issue from a left warning device mounted on the left side of the vehicle to the left of the driver.

The system may further include a center camera mounted in front of the driver and a central processor connected to the central camera and a forward warning device connected to the central processor which warns of an impending collision with a moving obstacle essentially in the forward direction of the vehicle.

The system may further include using another driver assistance system installed such as lane detection, structural barrier recognition and/or traffic sign recognition to recognize a stationary object. Any warning to the driver may be suppressed if the other driver assistance system determined that all objects detected in the immediate vicinity of the vehicle are stationary objects.

Various methods are provided herein for using a system mountable on a vehicle to provide object detection in the vicinity of the vehicle. The system includes a camera operatively attached to a processor. The camera is mounted at the rear of the vehicle. The field of view of the camera is substantially in the forward direction of travel of the vehicle along a side of the vehicle. Multiple image frames are captured from the camera. An intersection is detected while the vehicle is turning. A potential encroachment of the vehicle onto the sidewalk is determined at the intersection by the vehicle if the vehicle turns too sharply at the intersection. The contour of the curb of the sidewalk may be detected at the intersection by detecting a contour of the curb of the side-walk at the intersection using a structure from motion algorithm which processes image motion over time of the image frames. An obstacle, e.g., object or pedestrian may be detected on the sidewalk. A warning may be issued if the bus is determined to encroach the sidewalk and/or warning may be inhibited if the bus is determined not to encroach the sidewalk.

The terms "sidewalk" and "pavement" are used herein interchangeably. The terms "object and obstacle" are used herein interchangeably. The term "rear" as used herein in the context of the rear of a vehicle refers to the rear half of the vehicle near to the back or the rear passenger door of a bus. The terms "right" and "left" are from the point of view of a driver facing forward of a vehicle driving essentially in the forward direction of the vehicle. The term "corresponding" as used herein refers to matching image points in different image frames which are found to be of the same object point. The indefinite articles "a" and "an" is used herein, such as "a processor", "a camera", "an image frame" have the meaning of "one or more" that is "one or more processors", "one or more cameras" or "one or more image frames."

Although exemplary embodiments have been shown and described, it is to be understood these examples are not limiting. Instead, it is to be appreciated that changes may be made to these embodiments, the scope of which is defined by the claims and the equivalents thereof.

The invention claimed is:

1. At least one non-transitory machine readable medium including instructions that, when executed, cause a processing circuitry to perform operations comprising:
   receiving a first report from a first vehicle, the first report generated by the first vehicle for a first hazard detected by the first vehicle;
   receiving a second report from a second vehicle, the second report generated by the second vehicle for a second hazard detected by the second vehicle;
   analyzing the first report and the second report to make a determination that the first report and the second report identify a related hazard;
   aggregating the first report and the second report into a consolidated report based on the determination that the first report and the second report identify a related hazard; and
   processing the consolidated report to identify a contributing factor to the related hazard.

2. The at least one non-transitory machine readable medium of claim 1, wherein the operations further comprise:
   generating a display of a map including the related hazard from the consolidated report.

3. The at least one non-transitory machine readable medium of claim 2, wherein the related hazard is represented on the map at a center location of the first hazard and the second hazard.

4. The at least one non-transitory machine readable medium of claim 2, wherein the display of the map includes a counter indicating a number detected hazards.

5. The at least one non-transitory machine readable medium of claim 1, wherein the determination that the first report and the second report identify a related hazard is based on a location of the first hazard in the first report and a location of the second hazard in the second report.

6. The at least one non-transitory machine readable medium of claim 1, wherein the operations further comprise:
   performing a simulation to mitigate the related hazard, the simulation including a physical measure change in an environment of the related hazard.

7. The at least one non-transitory machine readable medium of claim 1, wherein the related hazard involved a pedestrian.

8. The at least one non-transitory machine readable medium of claim 1, wherein the related hazard involved a cyclist.

9. The at least one non-transitory machine readable medium of claim 1, wherein the related hazard includes at least one of a vehicle, a child riding on a toy vehicle, a wheelchair user, a structural barrier, a traffic sign, a tree, a wall, and a pole.

10. The at least one non-transitory machine readable medium of claim 1, wherein the operations further comprise
    processing the consolidated report to identify a root cause of the related hazard.

11. The at least one non-transitory machine readable medium of claim 1, wherein the first report includes one or more images associated with the detected first hazard.

12. The at least one non-transitory machine readable medium of claim 1, wherein the first report includes an indication of a location of the detected first hazard.

13. The at least one non-transitory machine readable medium of claim 1, wherein the first report includes an indication of a time when first hazard was detected.

14. A method for processing reports received from vehicles, the method comprising:
   receiving a first report from a first vehicle, the first report generated by the first vehicle for a first hazard detected by the first vehicle;
   receiving a second report from a second vehicle, the second report generated by the second vehicle for a second hazard detected by the second vehicle;
   analyzing the first report and the second report to make a determination that the first report and the second report identify a related hazard;
   aggregating the first report and the second report into a consolidated report based on the determination that the first report and the second report identify a related hazard; and
   processing the consolidated report to identify a contributing factor to the related hazard.

15. The method of claim 14, the method further comprising:
   generating a display of a map including the related hazard from the consolidated report.

16. The method of claim 14, wherein the determination that the first report and the second report identify a related hazard is based on a location of the first hazard in the first report and a location of the second hazard in the second report.

17. The method of claim 14, the method further comprising:
   performing a simulation to mitigate the related hazard, the simulation including a physical measure change in an environment of the related hazard.

18. The method of claim 14, wherein the related hazard involved a pedestrian.

19. The method of claim 14, wherein the related hazard involved a cyclist.

20. A system for processing reports received from vehicles, the system including a server operable to:
   receive a first report from a first vehicle, the first report generated by the first vehicle for a first hazard detected by the first vehicle;
   receive a second report from a second vehicle, the second report generated by the second vehicle for a second hazard detected by the second vehicle;
   analyze the first report and the second report to make a determination that the first report and the second report identify a related hazard;
   aggregate the first report and the second report into a consolidated report based on the determination that the first report and the second report identify a related hazard; and
   process the consolidated report to identify a contributing factor to the related hazard.

\* \* \* \* \*